UNITED STATES PATENT OFFICE.

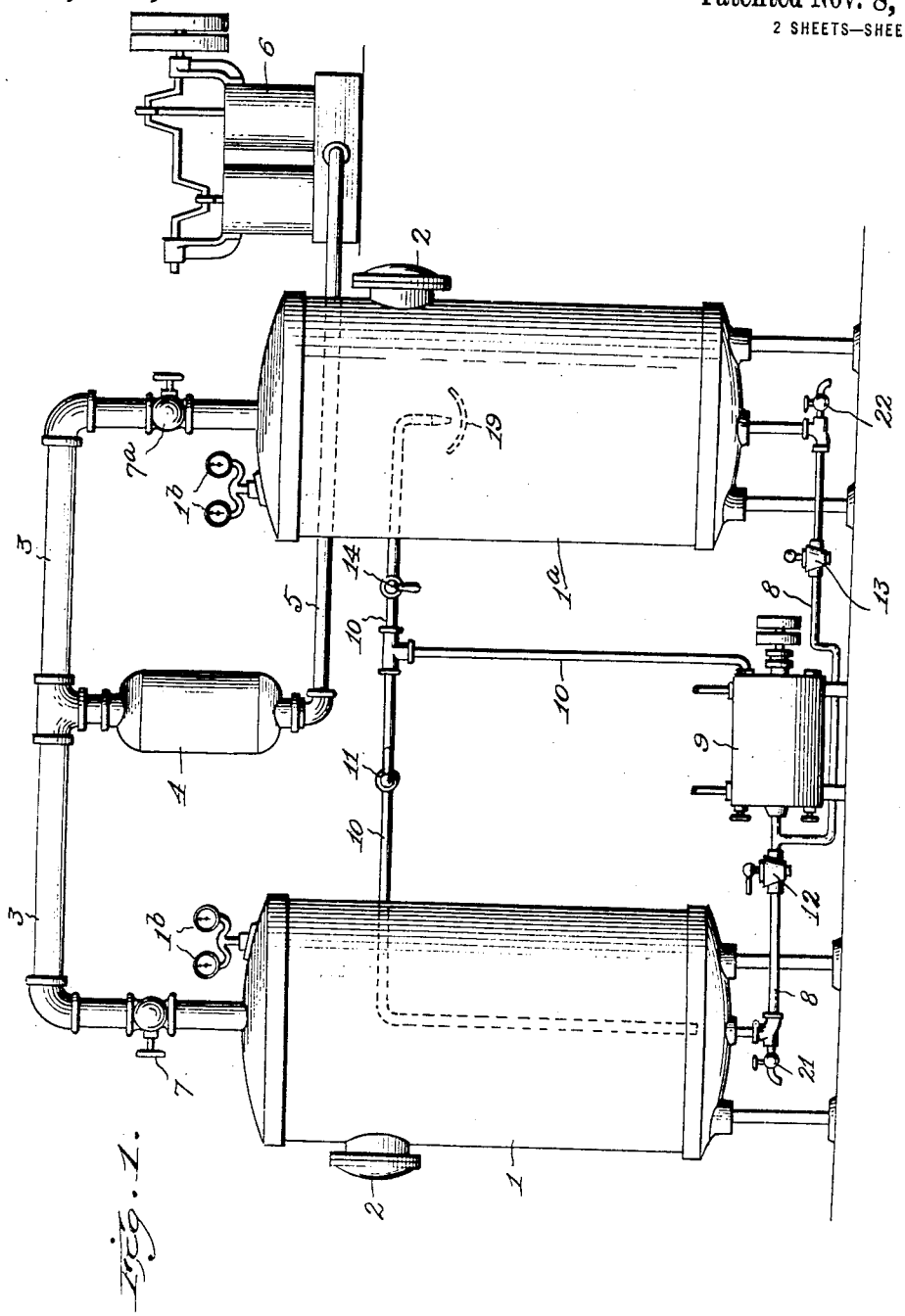

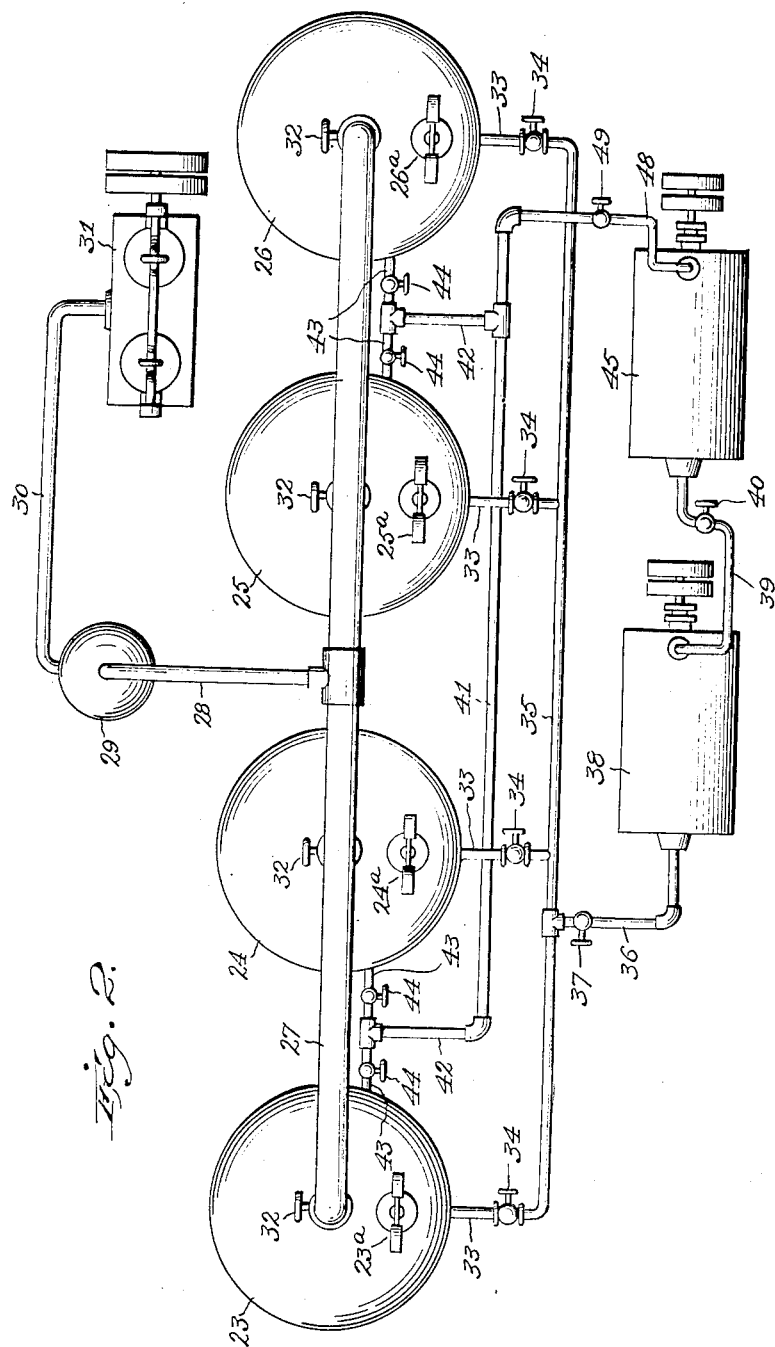

AAGE JENSEN, OF PORTLAND, OREGON, ASSIGNOR TO JENSEN CREAMERY MACHINERY COMPANY, INC., A CORPORATION OF NEW YORK.

METHOD AND APPARATUS FOR TREATING LIQUIDS.

1,396,632. Specification of Letters Patent. Patented Nov. 8, 1921.

Application filed May 31, 1919. Serial No. 301,131.

*To all whom it may concern:*

Be it known that I, AAGE JENSEN, a citizen of the United States, residing at Portland, county of Multnomah, State of Oregon, have invented certain new and useful Improvements in Methods and Apparatus for Treating Liquids, of which the following is a specification.

In patents heretofore granted to me, apparatus are disclosed adapted to handle and treat milk, cream and the like, whereby free oxygen and gaseous constituents first may be withdrawn, and whereby the material to be treated then may be subjected to what is designated popularly as batch or "flash" pasteurization or sterilization, and whereby the material then may be cooled rapidly without reincorporation of oxygen, and may be held and treated in this condition for the production of a final product.

In an application filed by me June 8, 1917, Serial No. 173,658, there has been set forth in some detail the advantages of such treatment, whereby the elimination of certain undesirables in the ordinary finished product is obtained, which it is unnecessary further to elaborate in the present application.

This application is designed to cover a process and apparatus for carrying out most efficiently the pasteurization and subsequent cooling of the material to be treated under conditions unfavorable to the action of oxygen on the product, whereby either or both steps may be carried on continuously to any desired extent, thus obviating the necessity for coördinating the relative sizes and numbers of the vacuum tank or tanks and the heating and cooling apparatus, and this object I accomplish by a continuous circulatory movement of the material to be treated from the vacuum tank or tanks through the heating or cooling apparatus and back to the tank or tanks until the desired heating or cooling result is obtained.

In the accompanying drawings I have illustrated two different forms of improved apparatus for accomplishing this particular result, in which:—

Figure 1 is an elevation, more or less diagrammatic, of one form of plant in which my process may be carried out.

Fig. 2 is a plan view, illustrating a modified form of plant.

In the said drawings, referring more particularly to Fig. 1, the reference numerals 1 and 1$^a$ denote closed containers, provided with the usual man-holes 2, through which the material to be treated may be supplied prior to the beginning of the process. From the top of said containers air and vapor discharge pipes 3 lead to a condenser 4, and from the bottom of the latter, through a pipe 5, communication is established with a suitable power driven vacuum or condenser pump 6, suitable cut-off valves 7 and 7$^a$ being provided in the pipe 3. Leading from the bottom of the containers 1 and 1$^a$ is a pipe 8, valved at 12 and 13, which discharges into a flash pasteurizer 9, preferably of the type illustrated in my prior Patent No. 1,080,455, granted December 2, 1913, and which here needs no further description. The discharge from the pasteurizer 9 is through a pipe 10, valved at 11 and 14 which leads back to and discharges into container 1 or 1$^a$, as the case may be. The containers 1 and 1$^a$ also are provided with the usual vacuum and pressure indicators 1$^b$.

In operation the entire equipment is cleaned and sterilized by washing and steaming, and a quantity of milk or cream to be treated is placed in the containers, and the man-holes 2 closed. The valves 11 and 12 in the pipes 10 and 8 being closed, and the valves 7 and 7$^a$ in the pipe 3 leading to the condenser 4 being opened, the vacuum pump 6 is put in operation, and by means of the vacuum gage 1$^b$ the operator can judge when the air has been removed from the milk or cream in the container 1. Having thus treated the material in the container 1 to remove the free oxygen and other gaseous contents, valve 7 on vapor discharge pipe 3 is closed, and valves 11 and 12 are opened, and the pasteurizer 9 put in operation by suitable power means. This results in a flow of the material being circulated and treated through said pasteurizer, and from thence through the pipe 10 back to the container 1, it being understood that the valve 14 in the pipe 10 and the valve 13 in pipe 8 are closed, thus cutting off entirely the container 1$^a$. The operation of the pasteurizer 9 on the material in the container 1 thus can be maintained for a length of time sufficient properly to pasteurize the contents of said tank, the treatment thus being a continuous circulating action of the pasteurizer upon the contents of said container.

When the desired pasteurization has been effected, the pasteurizer 9 may be changed as to the character of the medium supplied thereto to transform the same into a cooler, in the manner heretofore described in my Patent No. 1,080,455, and the milk or cream thus subjected to the desired cooling action described in said patent, said cooling action also being continuous in character until the desired temperature is obtained. By closing valves 12 in pipe 8 and valve 11 in pipe 10, a similar treatment of the liquid contents in container 1ª can be effected by simply changing over the treating medium of pasteurizer 9 and the manipulation of valves 13 and 14, after first having removed the free oxygen and other gaseous contents as previously described.

Thus it will be seen that a plurality of containers can be used for the liquid contents to be treated and stored with a single treating device possessing the combined feature of pasteurizing and cooling.

I call attention to two different means for introducing the treated liquid into the containers 1 and 1ª. In container 1 I show pipe 10 reaching substantially to the bottom of the container, whereas in container 1ª I show a deflector 19 located in the upper portion of the same. I find by experience that it is of advantage to use this deflector for certain liquids, (for example—cream rich in butter fat, by reason of its greater viscosity). This device permits the oxygen and other gaseous contents to become liberated with greater ease.

The process of treating additional batches of liquid may be continued by the repeated use of each container as soon as the treated material can be removed.

In Fig. 2 I have illustrated a modified apparatus wherein the process hereinbefore described may be carried out, said apparatus comprising a battery of four containers fitted with suitable man-holes. Thus I have shown the containers 23, 24, 25 and 26 connected at their tops by a vapor discharge pipe 27, which communicates, through pipe 28, with a condenser 29, that, in turn, through pipe 30, communicates with a vacuum pump 31, the pipes leading from the pipe 27 to said containers being provided with suitable valves 32 As in Fig. 1 each container is fitted with suitable vacuum and pressure gages 23ª, 24ª, 25ª, 26ª. Leading from the bottom of said containers are the pipes 33, valved at 34, and communicating with a common pipe 35, which communicates, through pipe 36, valved at 37 with a pasteurizer 38, similar in structure to the pasteurizer and cooler 9 in Fig. 1. Leading from pasteurizer 38 is a pipe 39, valved at 40 which communicates with a cooler 45 similar in structure to pasteurizer 38. Leading from cooler 45 is a pipe 48, valved at 49 connecting with a common pipe 41, that in turn communicates, through pipes 43, valved at 44, with the respective tanks, 23, 24, 25 and 26, at or close to the upper portions of the same, in a similar maner to that described in Fig. 1.

With this construction, it will be seen that any one of the containers may be utilized for first pasteurizing and then cooling the material to be treated in a continuous operation. Thus, so to utilize container 23, the valves 32 of the other three containers are to be closed, and said valve 32 of container 23 opened, and the vacuum pump 31 put in operation. Said container 23 being charged with milk or cream to be treated, thus is subjected to the action of the vacuum heretofore described, and when this vacuum is established to the desired degree valve 32 in vapor discharge pipe 27 is closed. The pasteurizer 38 and cooler 45 then will be put in operation, and the valve 34 of container 23, valves 37 and 40, and valve 44 of container 24 opened, the remaining valves being closed. This will result in a circulation of the contents of container 23 through the pasteurizer 38 and cooler 45 into container 24. By this method any of the containers may be used as a supply container, and the contents from the same discharged into any one of the other containers by manipulation of the valves 44, 34 and 32 of the respective containers. In order to maintain the vacuum in the receiving container under condition suitable to the operation, all that will be necessary will be to open valve 32 thereof, which will subject said container to the action of the vacuum pump 31. In this manner three of the four containers may be charged at all times with liquid and the fourth container left empty to act as a receiving container for any one of the same, proper communication readily being established through the desired manipulation of the various valves.

While I have shown and described a battery of four containers, it will be understood that the same may be augmented to any desired number.

I do not wish to be limited to the use of the particular pasteurizer or cooler as shown in Patent 1,080,455, but to reserve the right to use any suitable device that will accomplish the desired result.

Having thus described my invention, what I claim as new and desire to secure by Letters Patent, is:—

1. The process of treating milk, cream, and the like, which consists in subjecting the same to sub-normal pressure to withdraw free oxygen and gaseous content, and when in this condition in subjecting the same to a pasteurizing temperature while moving rapidly in a thin layer, said pasteurizing action being obtained through a continuous circulation of the material between the point of sub-normal pressure and the pasteurizing point.

2. The process of treating milk, cream, and the like, which consists in subjecting the same to sub-normal pressure to withdraw free oxygen and gaseous content, and when in this condition in first subjecting the same to a pasteurizing temperature while moving rapidly in a thin layer, said pasteurizing action being obtained through a continuous circulation of the material between the point of sub-normal pressure and the pasteurizing point, and then subjecting the material to a cooling action under similar conditions.

3. An apparatus for treating milk, cream, and the like, comprising a container, means for applying a vacuum thereto, a pasteurizing or sterilizing apparatus, and connections between said container and said pasteurizing apparatus for permitting a continuous circulatory movement of the material being treated through said container and said pasteurizing apparatus.

4. An apparatus for treating milk, cream, and the like, comprising a plurality of containers, means for applying a vacuum thereto, a pasteurizing apparatus, and connections between each of said containers and said pasteurizing apparatus for permitting a continuous circulatory movement of the material being treated through any one of said containers and said pasteurizing apparatus.

In testimony whereof, I have hereto set my hand and seal this 9th day of April, A. D. 1919.

AAGE JENSEN.